United States Patent
Krishnaswamy et al.

(10) Patent No.: US 9,924,465 B2
(45) Date of Patent: *Mar. 20, 2018

(54) APPARATUS AND METHODS FOR LOW POWER SENSING OF WIRELESS ACCESS TECHNOLOGIES

(71) Applicant: QUALCOMM Incorporated, San Diego, CA (US)

(72) Inventors: Dilip Krishnaswamy, Roseville, CA (US); Parag M. Kanade, San Diego, CA (US); Parvathanathan Subrahmanya, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 14/738,191

(22) Filed: Jun. 12, 2015

(65) Prior Publication Data
US 2016/0057700 A1 Feb. 25, 2016

Related U.S. Application Data

(63) Continuation of application No. 12/610,296, filed on Oct. 31, 2009, now Pat. No. 9,060,336.
(Continued)

(51) Int. Cl.
*H04W 52/02* (2009.01)
*H04W 88/06* (2009.01)
(Continued)

(52) U.S. Cl.
CPC ......... *H04W 52/028* (2013.01); *H04W 48/16* (2013.01); *H04W 52/0229* (2013.01);
(Continued)

(58) Field of Classification Search
CPC .......... H04W 8/005; H04W 52/0274–52/0283
See application file for complete search history.

(56) References Cited

U.S. PATENT DOCUMENTS

| 6,085,090 A | 7/2000 | Yee et al. |
| 6,356,538 B1 | 3/2002 | Li |
| (Continued) | | |

FOREIGN PATENT DOCUMENTS

| JP | 2005311687 A | 11/2005 |
| JP | 2005311687 A | 11/2005 |
| (Continued) | | |

OTHER PUBLICATIONS

NTT DoCoMo, Pilot Channel and Scrambling Code in Evolved UTRA Downlink (R1-050589), 3GPP TS RAN WG1 Ad Hoc on LTE, Sophia Antipolis, France, Jun. 20-21, 2005, 24 pages.*

(Continued)

*Primary Examiner* — Hoon J Chung
(74) *Attorney, Agent, or Firm* — Loza & Loza, LLP/Qualcomm

(57) ABSTRACT

Apparatus and methods for low power sensing of wireless access technologies are disclosed. In particular, a mobile wireless device, such as an access terminal, may utilize a lower power circuitry portion that operates at a lower power than active circuitry, such as a primary transceiver. The lower power circuitry portion includes a configurable searcher that is capable of sensing if signals of one or more various wireless access technologies are present. When the wireless device utilizes sleep or idle modes for power savings, use of the lower power sensing circuitry to sense the presence of wireless access technologies, rather than using an awoken higher power primary transceiver for sensing, affords increased power savings. An added ability of the (Continued)

lower power circuitry to be put into sleep or idles modes achieves even greater power savings.

29 Claims, 10 Drawing Sheets

Related U.S. Application Data

(60) Provisional application No. 61/218,552, filed on Jun. 19, 2009.

(51) Int. Cl.
*H04W 48/16* (2009.01)
*H04W 48/18* (2009.01)

(52) U.S. Cl.
CPC ............ *H04W 88/06* (2013.01); *H04W 48/18* (2013.01); *Y02B 60/50* (2013.01)

(56) References Cited

U.S. PATENT DOCUMENTS

| | | | |
|---|---|---|---|
| 8,285,243 | B2 | 10/2012 | Kang et al. |
| 2001/0038672 | A1 | 11/2001 | Staszewski et al. |
| 2005/0153714 | A1 | 7/2005 | Subrahmanya |
| 2006/0287008 | A1 | 12/2006 | Twitchell, Jr. |
| 2007/0014235 | A1 | 1/2007 | Stephens |
| 2007/0097895 | A1 | 5/2007 | Keshavarzian et al. |
| 2007/0109987 | A1 | 5/2007 | Kohlmann et al. |
| 2007/0129923 | A1* | 6/2007 | Langer ............... G06F 17/5022 703/13 |
| 2007/0178875 | A1 | 8/2007 | Rao et al. |
| 2007/0300088 | A1 | 12/2007 | Lippojoki |
| 2008/0200166 | A1 | 8/2008 | McCamon |
| 2008/0227482 | A1 | 9/2008 | Lin et al. |
| 2008/0242220 | A1* | 10/2008 | Wilson ............... H04M 1/7253 455/3.04 |
| 2008/0273552 | A1 | 11/2008 | Kim et al. |
| 2009/0023391 | A1 | 1/2009 | Falck |
| 2009/0047991 | A1 | 2/2009 | Elg |
| 2009/0059827 | A1 | 3/2009 | Liu et al. |
| 2009/0059899 | A1 | 3/2009 | Bendelac |
| 2010/0008272 | A1 | 1/2010 | Messinger et al. |
| 2010/0027449 | A1 | 2/2010 | Kim et al. |
| 2010/0067421 | A1 | 3/2010 | Gorokhov et al. |
| 2010/0322126 | A1 | 12/2010 | Krishnaswamy et al. |

FOREIGN PATENT DOCUMENTS

| | | |
|---|---|---|
| JP | 2006005518 A | 1/2006 |
| JP | 2008022340 A | 1/2008 |
| JP | 2008022340 A | 1/2008 |
| JP | 2008104100 A | 5/2008 |
| JP | 2008104100 A | 5/2008 |
| JP | 2009538012 A | 10/2009 |
| JP | 2009538012 A | 10/2009 |
| VE | 03026149 | 3/2003 |
| WO | 2005072001 A2 | 8/2005 |
| WO | WO-2005072001 A2 | 8/2005 |
| WO | 2007132016 A1 | 11/2007 |
| WO | WO-2007132016 A1 | 11/2007 |
| WO | WO-2008116120 A2 | 9/2008 |
| WO | 2009044365 A2 | 4/2009 |
| WO | WO-2009044365 A2 | 4/2009 |

OTHER PUBLICATIONS

Blankenbeckler, "An Introduction to Bluetooth", Jun. 2, 2008, Wireless Developer Network, 5 pages, http://web.archive.org/web/20080602090143/http://www.wirelessdevnet.com/channels/bluetooth/features/bluetooth.html.
Co-pending U.S. Appl. No. 12/152,909, filed May 19, 2008.
Co-pending U.S. Appl. No. 12/152,911, filed May 19, 2008.
Co-pending U.S. Appl. No. 12/152,915, filed May 19, 2008.
Hodgdon C., "Adaptive Frequency Hopping for Reduced Interference between Bluetooth and Wireless LAN", May 2003, Design & Reuse, 4 pages, http://www.design-reuse.com/articles/5715/adaptive-frequency-hopping-for-reduced-interference-betweenbluetooth-and-wireless-lan.html.
International Search Report and Written Opinion—PCT/US2010/039182, International Search Authority—European Patent Office—dated Oct. 4, 2010.
Johnson Consulting, "Bluetooth—An Overview, Establishing connections", Apr. 17, 2004, Johnson Consulting, 2 pages, http://www.swedetrack.com/images/bluetl4.htm.
Taiwan Search Report—TW099119962—TIPO—dated Jul. 3, 2013.
Co-pending U.S. Appl. No. 12,152,909, filed May 19, 2008.

* cited by examiner

APPARATUS AND METHODS FOR LOW POWER SENSING OF WIRELESS ACCESS TECHNOLOGIES

CLAIM OF PRIORITY UNDER 35 U.S.C. § 119

The present Application for Patent claims priority to Provisional Application No. 61/218,552 entitled "Apparatus and Methods for Low Power Sensing of Communication Systems" filed Jun. 19, 2009, and assigned to the assignee hereof and hereby expressly incorporated by reference herein.

CLAIM OF PRIORITY UNDER 35 U.S.C. § 120

The present Application for Patent is a Continuation of patent application Ser. No. 12/610,296 entitled "APPARATUS AND METHODS FOR LOW POWER SENSING OF WIRELESS ACCESS TECHNOLOGIES" filed Oct. 31, 2009, pending, and assigned to the assignee hereof and hereby expressly incorporated by reference herein.

BACKGROUND

Field

The present disclosure relates generally to apparatus and methods for low power sensing of wireless access technologies, and more specifically to sensing or searching for various wireless access technologies or radio access technologies (RATs) using a low power means in a mobile device operable for detecting and/or acquiring a signal from one or more of the various RATs and communicating detection to other higher power domains in the mobile device.

Background

In certain wireless devices, such as mobile communication devices, it is desirable to utilize battery energy efficiently in order to provide long service between recharges. In particular wireless devices at least a portion of the circuitry within the devices can be turned on for short periods of time when the device is actively receiving or transmitting, and at least some of the energy consuming circuitry turned off during idle periods or sleep cycles. It is desirable to minimize the time that such devices are turned on in order to maximize energy savings.

Additionally, it is known to provide user equipment (UE), access terminals (ATs), or other mobile devices that utilize various radio area technologies (RATs), such as wireless wide area network (WWAN) technologies (e.g., WCDMA, WiMAX, UMB, CDMA200, IS-95, LTE, etc.). Dependent on the current state of network service available to a mobile device in a particular location, for those RATs not available, powering up of active circuitry to receive and transmit using these networks is unnecessary. Such known techniques thus lead to unnecessary power usage by powering up active or primary circuitry for detection of particular RATs that are not present. Accordingly, when a mobile communication device is out of a service area for a particular RAT, it may be desirable to shut down portions of circuitry in the device that are not required for such RATs in order to save energy. However, as network conditions or mobile location changes, it is also desirable to periodically check or sense whether a particular RAT is currently available thus requiring power up of primary circuitry in known systems. Accordingly, lower power sensing of various RATs by a mobile device that saves energy over the use of active or primary circuitry for sensing, particularly in those instances where certain RATs are not available, would be desirable.

SUMMARY

In an aspect, an apparatus for use in a mobile device is disclosed. The apparatus includes a first circuitry portion operable at first power level wherein the first circuitry portion includes at least one configurable searcher that is operable to sense signals of one or more wireless access technologies. The apparatus also includes a second circuitry portion that is configured to operate at a power level higher than the first power level of the first circuitry portion in the mobile device.

In another aspect, a method for use in a mobile device is disclosed. The method includes searching for one or more wireless access technologies using a first circuitry portion configured to operate at a power level lower than power levels of a second circuitry portion in the mobile device. Additionally, the method includes issuing a wakeup trigger configured to wake up the second circuitry portion when at least one predetermined wireless access technology of the one or more wireless access technologies is sensed.

According to another aspect, an apparatus for use in a mobile device is disclosed. The apparatus includes means for searching for one or more wireless access technologies using a first circuitry portion configured to operate at a power level lower than power levels of a second circuitry portion in the mobile device. The apparatus also includes means for issuing a wakeup trigger configured to wake up the second circuitry portion when at least one predetermined wireless access technology of the one or more wireless access technologies is sensed.

According to still one more aspect, a computer program product comprising a computer-readable medium is disclosed. The computer-readable medium includes code for causing a computer to search for one or more wireless access technologies in a mobile device using a first circuitry portion configured to operate at a power level lower than power levels of a second circuitry portion in the mobile device. Additionally, the computer-readable medium also includes code for causing a computer to issue a wakeup trigger configured to wake up the second circuitry portion when at least one predetermined wireless access technology of the one or more wireless access technologies is sensed.

BRIEF DESCRIPTION OF THE DRAWINGS

FIG. 3 illustrates a block diagram of a low power partition of the wireless platform of

FIG. 2.

DETAILED DESCRIPTION

The presently disclosed apparatus and methods provide minimization of energy usage when a wireless device, such as an access terminal (AT), by providing a low power sensing circuitry that is configured to operate at a lower power level or with less energy than the primary transceiver in the mobile device. The low power sensing circuitry is capable of sensing signals of one or more wireless access technologies without the use of the primary transceiver. Accordingly, the sensing of RF wireless signals may be performed without the active or higher power portions of a wireless device (e.g., active portion of a wireless mobile station modem (MSM) platform or chip, such as those implementing the primary transceiver) with only lower power circuitry active, thus saving energy.

It is noted that the techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Ultra Mobile Bandwidth (UMB), Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Figure 1:
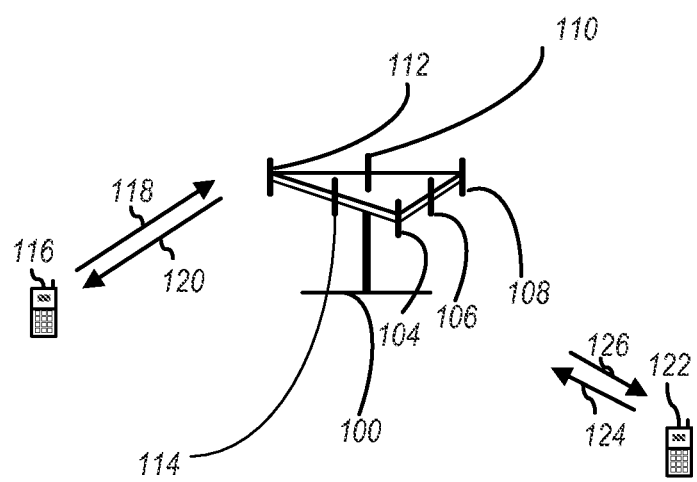
FIG. 1 illustrates an example of a wireless communication system.

Referring to FIG. 1, an example of a multiple access wireless communication system in which the present methods and apparatus may be employed is shown. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over a downlink or forward link 120 and receive information from access terminal 116 over an uplink or reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In an aspect, antenna groups each are designed to communicate to access terminals in a sector of the areas covered by access point 100. Access point (AP) 100 may be a fixed station used for communicating with the terminals and may also be referred to as an access point, a Node B, or some other terminology. An access terminal may also be called an access terminal, user equipment (UE), a wireless communication device, terminal, access terminal or some other terminology.

It is further noted that although only one base station or AP 100 is shown in FIG. 1, there may be multiple base stations (or multiple RATs) in an area which respectively deliver service for a respective network and radio access technology. Accordingly, an AT, UE or mobile device in a particular area may be configured to sense and/or operate with multiple ones of the RATs in an area.

As will be described in more detail below, the presently disclosed apparatus and method provide energy savings for a mobile device by shutting down portions of the device (e.g., active portions of the wireless mobile station modem (MSM) platform or chip) that are not required in such a state, with only a low-power sensing circuitry active. Nonetheless, as service conditions change or the mobile device moves in or out of service areas for particular RATs, at least some periodic searching for available RATs is desirable. Accordingly, the present disclosure also presents a low-power sensing circuitry capable of searching and acquiring either a wide-area-networking (WWAN) signal or a local area networking (LAN) signal and capable of waking up a primary transceiver upon successful detection of a networking signal. The primary transceiver includes RF and baseband circuitry and is capable of implementing one or more various RAT standards, such as WWAN standards including WCDMA, WiMAX, LTE, UMB, CDMA2000, and IS-95, as a few examples. The transceiver in a mobile device may also include RF circuitry capable of implementing one or more various LAN standards such as WiFi, or communication with home devices using WAN standards such as Femto cells and Atto cells, etc.

In an aspect, the low power sensing circuitry includes a radio frequency (RF) receive chain for one or more frequency bands of interest, and baseband processing. The low power baseband processing is configured to implement a configurable searcher operable to search for one or more wireless standards and a controller (e.g. DSP or ARM processor). The low power sensing circuitry may be activated or woken up periodically with a fixed period or a variable period. Furthermore, the wakeup periodicity (or duty cycle) of the low power sensing circuitry may be configured to be a long period relative to the wakeup duration for sensing. This can lead to significant improvements in terms of standby time for the wireless device by lowering energy usage. Upon each activation, the searcher is configured to search for a wireless signal from one or more wireless standards in one or more frequency bands. If successful, the low power sensing circuitry will send a trigger indicating successful detection to the primary transceiver. If the primary transceiver is in a low power state, it can be configured to transition to a higher power state. If the primary transceiver is already in a higher power state when it receives the trigger, it may choose to ignore the trigger. In the higher power state, the primary transceiver may perform functions such as demodulation, decoding, transmission, etc. It should be noted that the low power sensing circuitry and the primary transceiver may be implemented in the same die or set of dies with some components possibly shared between the two. The low power sensing circuitry along with the shared components from the primary transceiver can all reside in the same power domain, while the non-shared components of the primary transceiver can reside in a different power domain on the platform.

Figure 2:
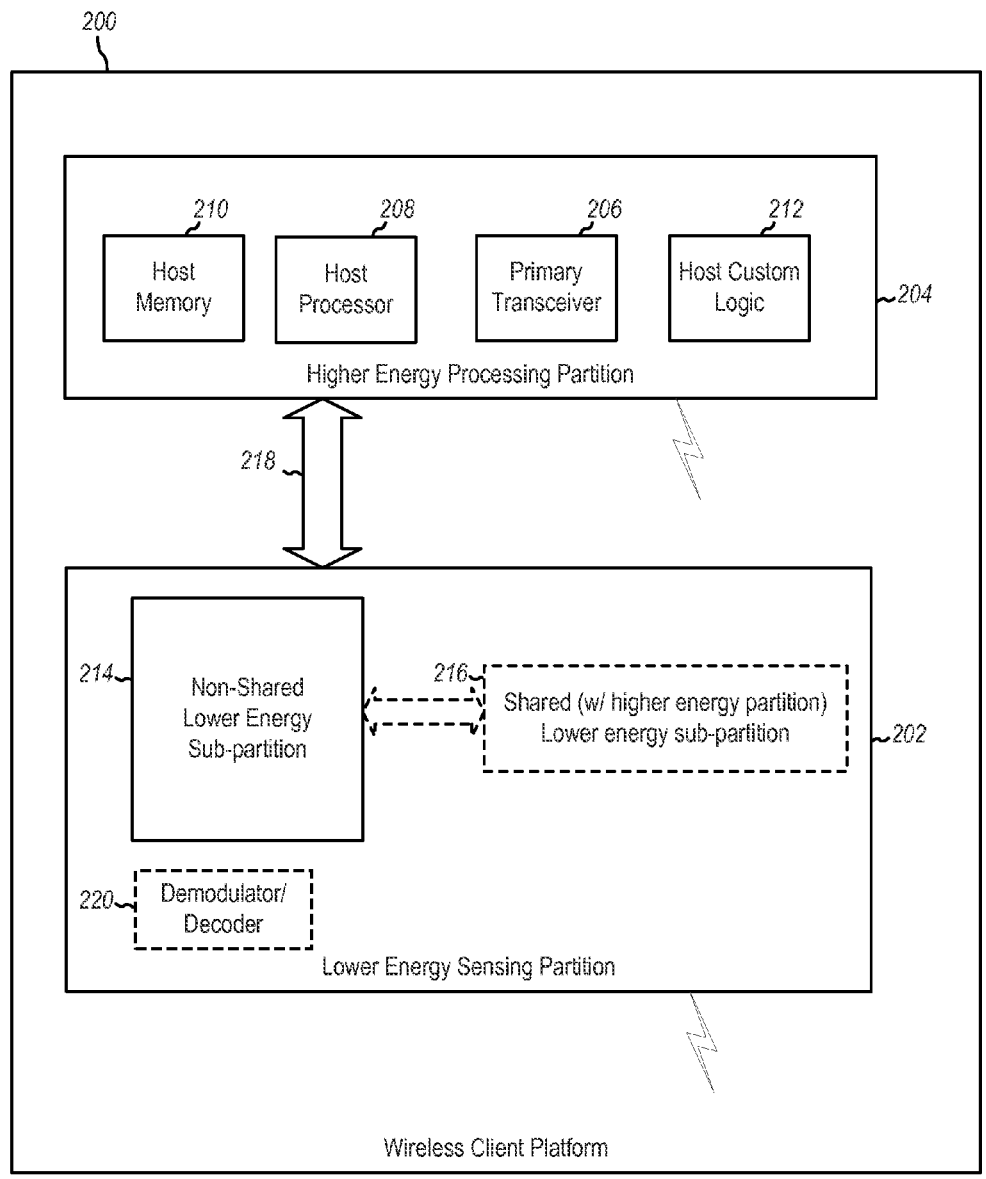
FIG. 2 is a block diagram of a wireless platform according to the present disclosure for use in a mobile device.

In one example, FIG. 2 illustrates a wireless client platform 200, which may be implemented in one chip or ASIC as illustrated, or alternatively bifurcated between multiple chipsets. Platform 200 may be used in a mobile wireless device, such as devices 116 or 122 in FIG. 1. The platform 200 includes a first portion 202 that is a lower energy wireless sensing partition for sensing one or more different wireless technologies and frequencies using lower power means, implementable as lower power hardware, software operating on a lower power processor, or a combination thereof.

Platform 200 also includes a Higher Energy Processing Partition 204, which operates at higher power level relative to portion 202. The partition 204 may include the primary transceiver 206, as well as host processing 208, memory 210, custom logic 212, etc., which implement one or more radios that are needed for receiving, processing, and transmitting information in platform 200

It is contemplated that the low power sensing circuitry (e.g., at least a part of portion 202) and the primary transceiver may be implemented in the same die as shown in FIG. 2 or separate sets of dies but with some components shared between the two. In an aspect, sensing circuitry of partition 202 can be implemented in a separate power domain. In another aspect, some shared components from the primary transceiver can be implemented in the same power domain as some components of the sensing circuitry. As an illustration of this example, FIG. 2 shows a Non-Shared Lower Energy Sub-partition 214 and an optional Shared Lower energy sub-partition 216 that is configured to share components with the higher energy partition 204. As a further example, the low power sensing circuitry in partition 202 could include devices such as one or more of the following: analog-to-digital (A/D) converters, digitized sample memory, a searcher device implemented either in hardware or software, and a processor. However, in an alternative it is also contemplated that one or more of these devices could be configured to operate at lower power for the low power sensing circuitry, but also configured with sufficient operational capacity to also be used for the higher power operations of the primary receiver, and thus shared. In this example it is also contemplated that the shared components of the low power sensing circuitry along with the shared components from the primary transceiver may all reside in the same power domain as shown in FIG. 2 (i.e., partitions 214 and 216 in the same power domain 202), while the non-shared components of the primary transceiver would reside in a different power domain (e.g., 204) on the platform 200.

Wakeup signals and interrupts (e.g., via communication coupling 218) can be provided by a real time clock (RTC) domain. An RTC domain is typically implemented a lower frequency clock (e.g., 32 kHz) that has uses less energy and may continue operation when a mobile device is sleeping and the higher frequency, and higher power voltage controlled crystal oscillator (VCXO) clocks used for normal or active operation in the primary transceiver are put to sleep. As an example, an RTC timer can be used to activate the sensing circuitry in lower energy partition 202 periodically, either at fixed or variable periodicity. Also, the wakeup trigger can be used to trigger an interrupt in the RTC domain that can be used to wake up the primary transceiver. When the system is in an out-of-service mode, the higher power radios can be shut down in the power domains that they reside in, and only the sensing circuitry is remains active. The period of wakeup for the sensing circuitry can be kept uniform during the entire duration of operation of the device. Such a period of wakeup can be changed if the device is shut down and the device restarted. All of the sensing circuitry or merely a portion of the sensing circuitry may be always active (such as the components comprising the timer that needs to wake-up the sensing circuitry periodically.

Additionally, in an aspect the searcher effected by partition 202 can be configured to search for a subset of possible wireless technologies, rather than all possible RATs. In another aspect, the sensing or searching of wireless signals by partition 202 may include measuring energies at different wireless carrier frequencies (which may correspond to different wireless technologies or different bands within a technology (e.g., searching for 4 different WCDMA bands)). Furthermore, sensing or searching may also include correlating received signals with stored reference information such as scrambling codes (such as in WCDMA as merely one example).

It is also contemplated in a further aspect that the lower power partition 202 may be configured to demodulate and decode at least a portion of the received signals to decipher or determine additional information regarding the sensed wireless access technologies such as identifier information (e.g., information identifying a network or transmitter, or other information such as timing information, geographic information, etc.) without demodulating and decoding the user-dedicated signals, which is typically performed by the primary transceiver. Accordingly, partition 202 is shown with an optional demodulator and decoder 220 configured to decipher or determine additional information regarding wireless technologies from the received signals.

Figure 3:
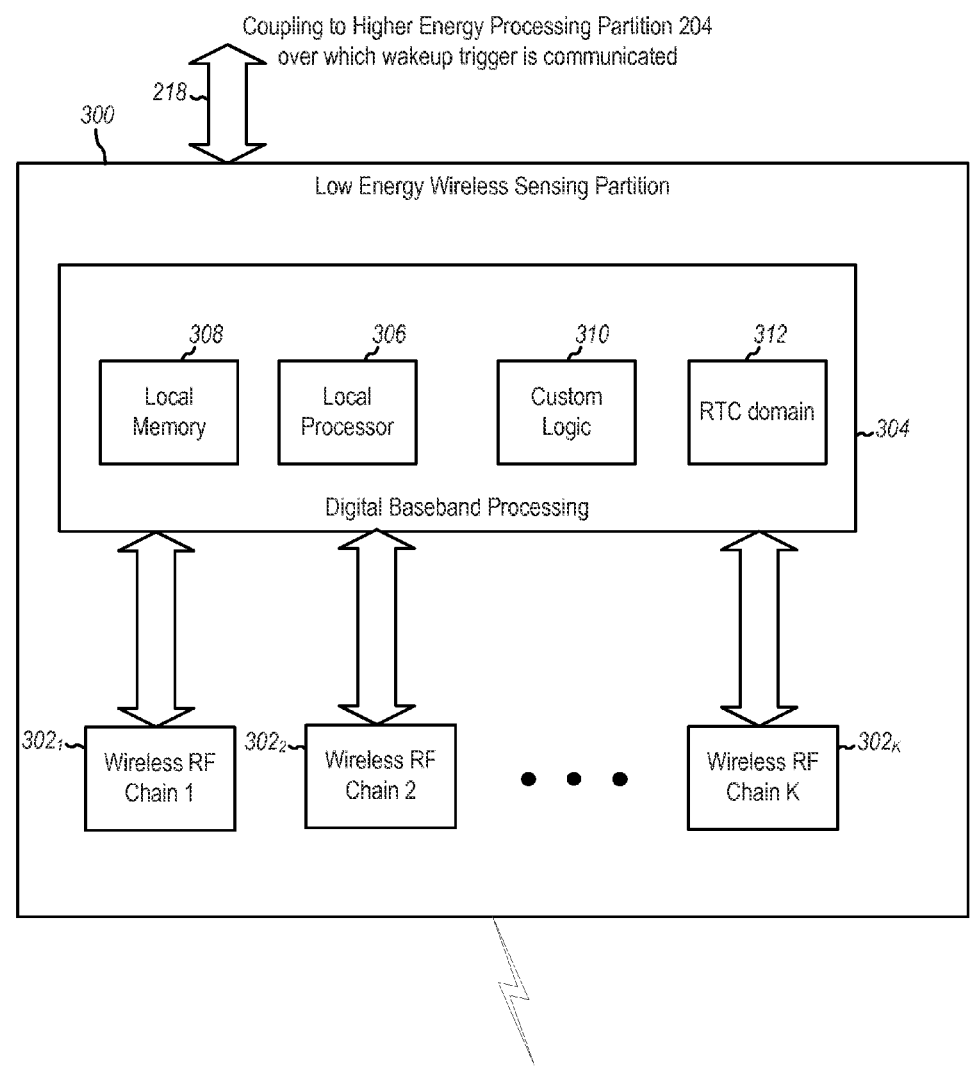

In a further aspect, FIG. 3 illustrates one exemplary implementation of a lower energy or power partition 300 that may be used for partition 202 shown in FIG. 2. As shown, the lower energy sensing partition 300 may include a K number of wireless RF-analog receive chains $302_1$-$302_K$ for one or more frequency bands k of interest (e.g., different wireless access technologies), and a baseband processor 304 configured to operate at least at the lower power of partition 300 and effect a configurable searcher to search for one or more wireless access technologies. In an aspect, the low energy partition's digital baseband 304 includes a local processor 306, memory 308, custom logic 310 such as accelerators, to process received wireless signals, and minimal software to perform such tasks. The software and custom logic can be configured to process any subset of tasks such as sensing for a subset of wireless signals. The lower power baseband circuitry 304 may also be configured to include a configurable searcher (e.g., implemented, at least in part, by custom logic 310) and a processor or controller (e.g. DSP or ARM processor) for sensing one or more wireless standards. In an aspect, memory 308 may store with stored reference information such as scrambling codes (such as in WCDMA as merely one example) for use in correlating received signals with known technologies.

In another aspect, the digital baseband 304 may be configured to perform just enough processing of signals from the RF chains 302 in order to sense or detect the presence of a wireless access technology, such that a trigger via coupling 218 may be sent to wake up the higher power partition 204 to perform actual demodulation and decoding of the signals. Additionally, in an aspect baseband 304 may also include at least one RTC domain timer 312 to wake up the partition 300 to periodically perform sensing tasks while higher energy partition sleeps.

It is noted that that a lower-leakage lower performance library may be used for digital baseband processing or other portions, processes, or processing in the lower energy partition 300 as compared with other circuitry, such as the higher energy partition 204 (or even other portions of the lower energy partition 300 in another example). An example of such a lower leakage library would include slower transistors with lower leakage in the same process technology used for the lower energy partition 300. Furthermore, it is contemplated that a less complex design for the RF components for the various RF chains could be employed with relaxed constraints, such that the design requires less energy with its simpler implementation, thereby saving even more energy. For example, non-digital-baseband components related to Rx for the RF chains can be implemented in a lower performance process technology relative to implementations for the higher-energy processing.

Figure 4:
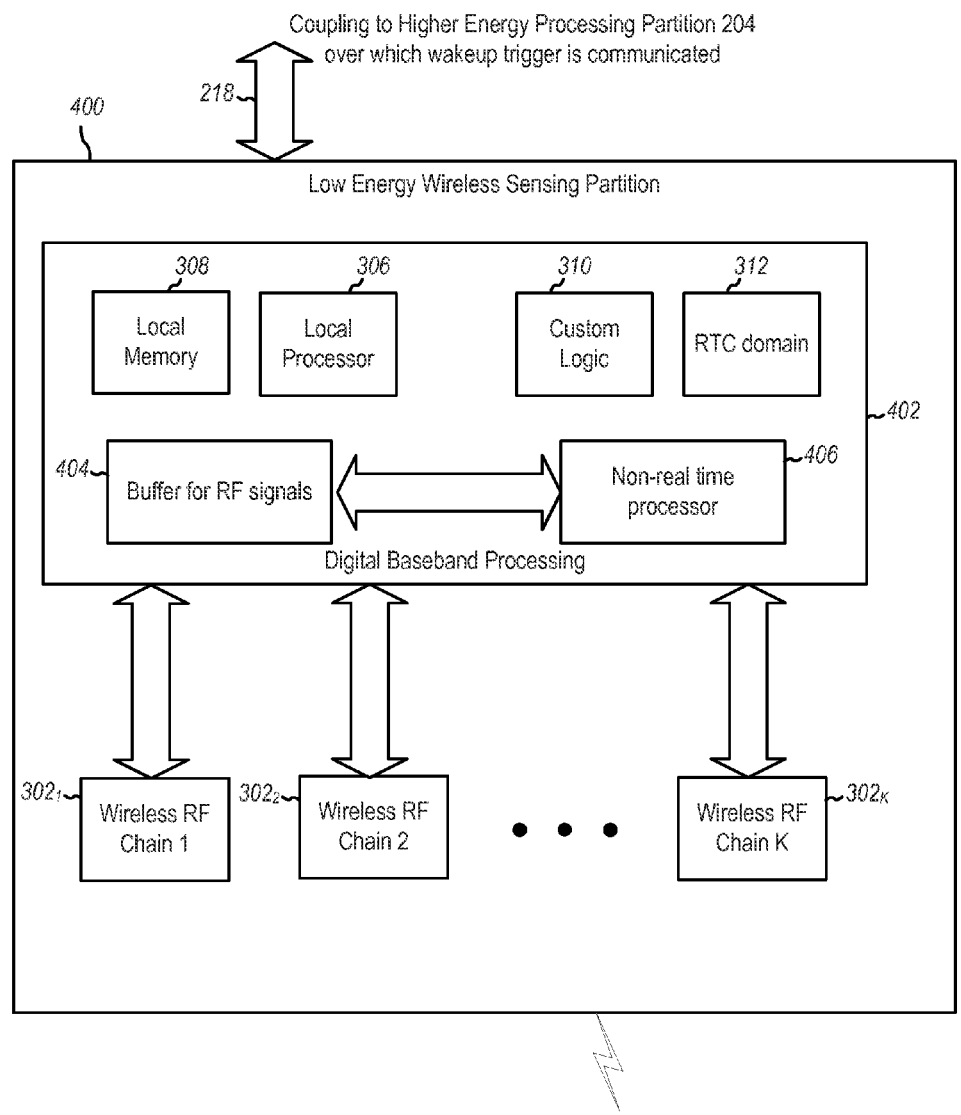
FIG. 4 illustrates a block diagram of another example of the low power partition of the wireless platform of FIG. 2.

In an alternative, processing in the lower power partition could happen in non-real time that is time independent of other time domains in either the lower power partition or higher power partition. Accordingly, FIG. 4 illustrates another exemplary implementation of a lower energy or power partition 20 that may be used for partition 202 shown in FIG. 2. The partition 400 is an example of a partition that may include slow non-real-time processing of buffered sensed information in making a determination whether or not one or more particular RATs are present. It is noted that numbered elements in FIG. 4 correspond to similarly numbered elements previously discussed with respect to FIGS. 2 and 3, and description of these elements has been omitted for sake of brevity.

Like the partition 300 in FIG. 3, lower power partition 400 includes digital baseband processing 402 engendering a configurable searcher to search for one or more wireless access technologies. The digital baseband processing 402, however, includes a buffer 404 that is configured to buffer RF signals received by one or more of the RF receive chains 302. Signals temporarily stored in buffer 404 are then read out to a non-real time processor 406 that can process the signals to determine if one or more RATs are present. It is noted that the non-real time processor 406 will process the signals with respect to active wireless signal processing (e.g., by processor 208 in partition 204) such that non-real time processing may take place contemporaneous or simultaneous with operation of the higher energy domain (partition 204), yet time independent or asynchronous.

Figure 5:
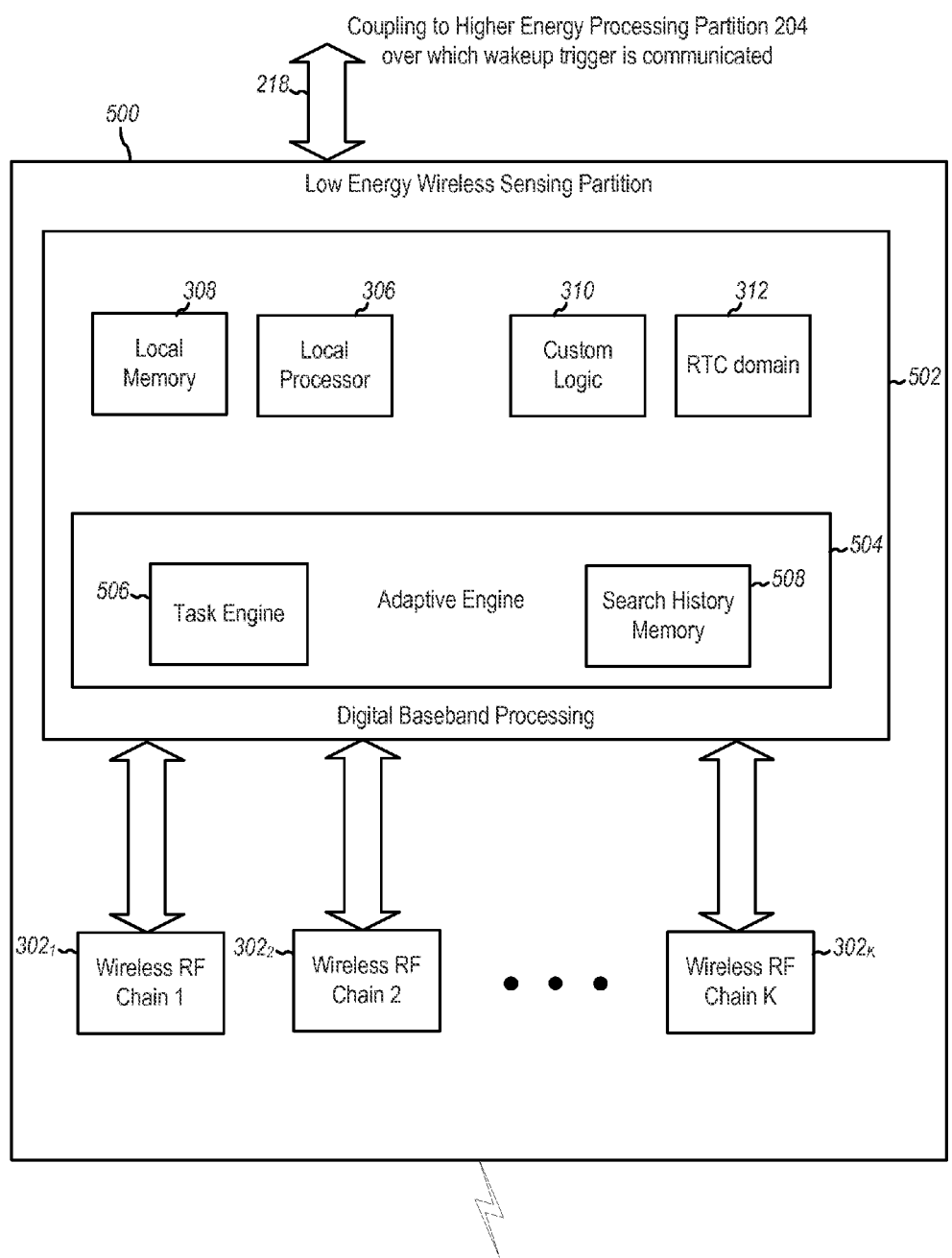
FIG. 5 illustrates a block diagram of yet another example of the low power partition of the wireless platform of FIG. 2.

In yet another alternative, the searcher or searching/sensing functionality can be configurable or adaptable such that tasks may be reordered or changed based on past search history. Thus, the searcher may be configured to search for a different wireless technology during each waking time period, or different wireless technologies could be prioritized where the searcher first looks for a first technology, next a second technology, and so forth. Additionally, task reordering/changes could be based on criteria such as graded carrier signal strength levels or graded correlation with reference signals. Accordingly, FIG. 5 illustrates yet another exemplary implementation of a lower energy or power partition 500 that may be used for sensing partition 202 shown in FIG. 2. In the particular example of FIG. 5, a digital baseband processing 502 may include an adaptive engine 504, which yet another exemplary variation to implement a configurable searcher to search for one or more wireless access technologies. In one example, the adaptive engine 504 may include a task engine 506 in conjunction with a memory such as a search history memory 508, configured to determine a list of RATs to sense. Additionally, the task engine 506 may adaptively change the list to add or delete various RATs to be sensed, and may be also based on prior sensed information, such as which RATs have been previously sensed.

Furthermore, the task engine 506 may be configured to order or prioritize the searching tasks based on a predetermined metric. For example, engine 506 may be configured to order which wireless access technology or reorder a previously set ordering based on prior sensed RATs, for example. In order to implement this functionality, the adaptive engine may employ the search history memory 508 as illustrated, or equivalent memory to keep track of those wireless access technologies searched for and the ordering in which the technologies are searched by partition 500. Furthermore the task engine 506 in conjunction with memory 508 may be configured to determine a list of wireless access technologies to search for, using prior sensed information. The predetermined metric may also include signal strength or the degree of signal correlation.

Although the apparatus of FIGS. 3-5 illustrate multiple wireless RF chains 302, it is noted that one RF chain or RF chain logic could be utilized wherein the RF chain is shared for sensing different multiple RATs. That is, a single RF chain 302 may be configurable such that it can be reused to sense two or more different RATs.

Additionally, it noted that in an aspect at least a portion of the circuitry of the low power circuitry (e.g., 202, 300, 400, or 500) may be configured with a lower leakage library of design components compared to components of the higher power circuitry (e.g. partition 204). In another aspect, it is noted that the low power circuitry (202, 300, 400, or 500) may have at least portions thereof implemented with one or more first components that are equivalent in functionality to portion implemented with one or more second components in the higher power partition 204, where the first components operate slower or with lower leakage as compared with the second components. For example, the first components may be implemented with a lower leakage library as discussed previously. Examples of such functionalities may include decoding, demodulating, and signal processing.

Furthermore, it is noted that the first components may be configured to consume less energy to perform the same functions or tasks performed by the second components. Thus, for example, various components in the lower energy partition (202, 300, 400 or 500) would be implemented with a lower energy or lower leakage library to perform the same tasks that can be performed as well in the higher energy partition 204. Therefore, although the lower leakage library has slower performance, if timing is not critical for the performance of various tasks, these task can be performed by the lower energy partition for increased power savings. In instances when performance of these same tasks might become time critical, execution could then be switched to the higher energy partition components having faster performance characteristics.

Figure 6:
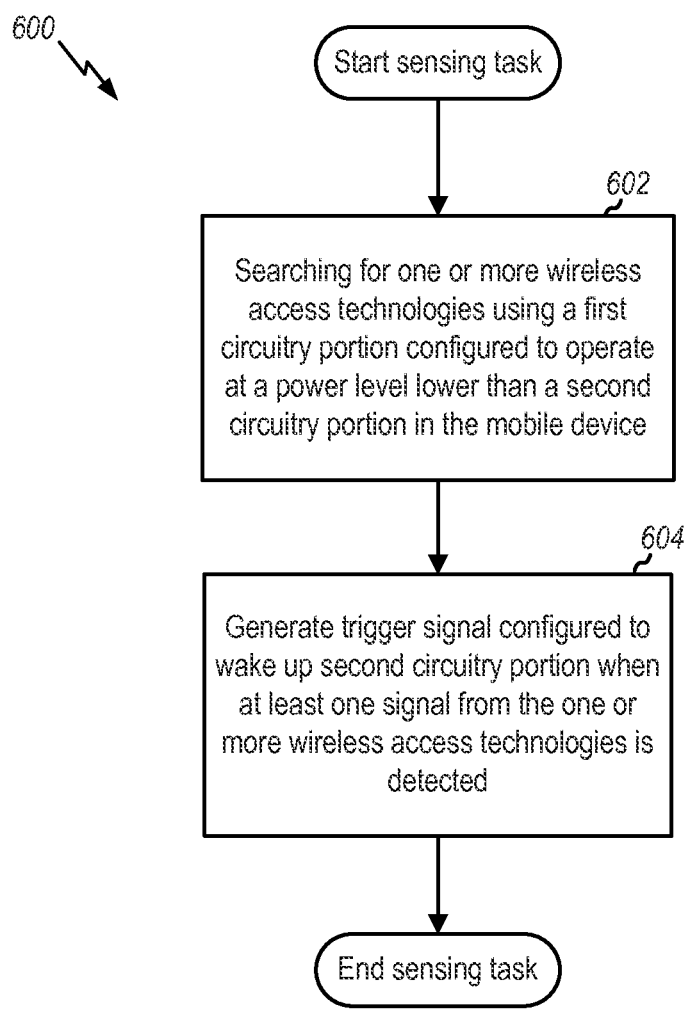
FIG. 6 is a flow diagram of a method for use in a mobile device for low power sensing of wireless technologies in a mobile device.

FIG. 6 illustrates an exemplary method that may be used to lower energy usage in a mobile device when sensing wireless access technologies. As shown, method 600 includes searching for one or more wireless access technologies using a first circuitry portion (e.g., sleep or idle mode circuitry such as partitions 202, 300, 400 or 500) configured to operate at a power level lower than a second circuitry portion (e.g., active circuitry or primary transceiver, such as higher energy processing partition 204 in FIG. 2) in the mobile device as shown in block 602. After search or sensing for one or more wireless access technologies is performed in block 602, flow proceeds to block 604 where a trigger signal configured to wake up the second circuitry portion is generated by the first circuitry portion when at least one signal from the one or more of the wireless access technologies is detected.

In a further example, if the first circuitry portion, after searching in block 602 does not detect a wireless technology, the first circuitry is put to sleep and then awakened after some predetermined periodicity (either variable or fixed) to begin sensing once again in block 602. In another aspect, the sensing or first circuitry portion may be activated periodically with a fixed period or a variable period. Upon each activation, the sensing circuitry is operable to search for a wireless signal from one or more wireless technologies in one or more frequency bands. If successful, the sensing circuitry sends a trigger signal to the active circuitry including the primary transceiver indicating successful detection. If the active circuitry is in a low power state, the active circuitry can be configured to transition to a higher power state upon receipt of the trigger. If the active circuitry is already in a higher power state when receiving the trigger, the active circuitry may be configured to choose to ignore the trigger or use the trigger to register the sensing of another wireless access technology if different from the technology currently being demodulated/decoded in the primary transceiver and processed by the active circuitry. In the higher power state, the primary transceiver may perform not only demodulation and decoding, but other functions such as transmission as well.

Figure 7:
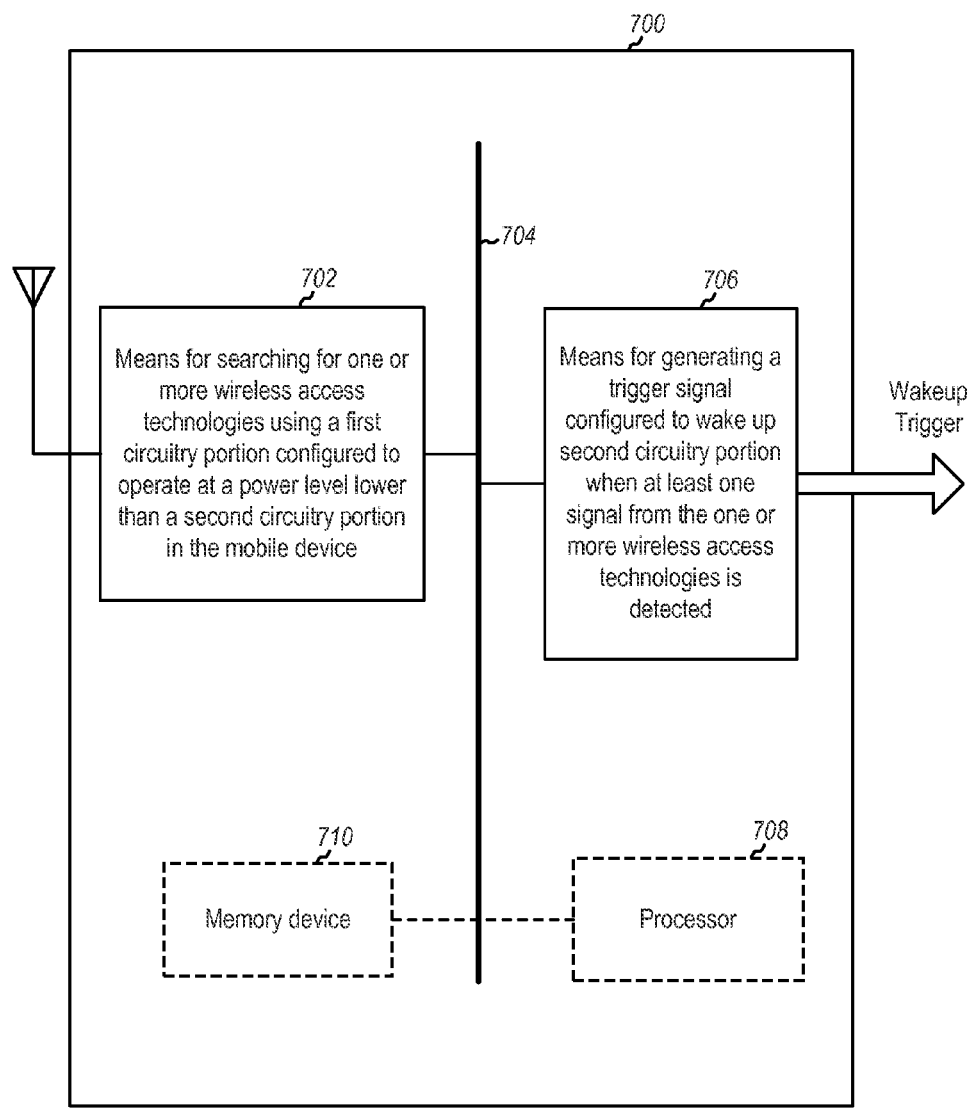
FIG. 7 illustrates a block diagram of an apparatus for use in a mobile device for low power sensing of wireless technologies in a mobile device.

FIG. 7 illustrates a block diagram of an apparatus 700 for use in a mobile device for low power sensing of wireless technologies in a mobile device. In one example, the apparatus 700 may be implemented as a low power partition in a chipset or platform, such as partition 202 in the platform of FIG. 2 (or variations thereof presented in FIGS. 3-5). Apparatus 700 includes a means 702 for searching for or sensing of one or more wireless access technologies using a first circuitry portion configured to operate at a power level lower than a second circuitry portion in the mobile device. Means 702 senses the technologies via received wireless RF signals, thus an antenna input is shown to represent reception of these wireless signals.

In an aspect, means 702 may be implemented by the low power partitions 202, 300, 400, or 500 and more particularly by the disclosed wireless RF chains 302 and Non-Shared Lower Energy Sub-partition 214 or digital baseband processing (e.g., 304, 402, or 502). In another aspect, means 702 may be implemented through hardware, software, firmware, or any combination thereof. In an example, means 702 engenders a configurable searcher that may be configured to search for one or more wireless technologies in a variety of different configurations as discussed previously. Apparatus 700 is also illustrated with a communication coupling 704, such as a communication bus or equivalently functioning device, to illustrate communication of information to other means or devices in apparatus 700, such as the communication of the determination of at least one wireless access technology by means 702 to other means in apparatus 700.

Apparatus 700 further includes means 704 for generating a trigger signal configured to wake up a second circuitry portion (e.g., Higher Energy Processing Partition 204 in FIG. 2) when at least one signal from the one or more wireless access technologies is detected by means 702. In an aspect, means 704 may be implemented by the low power partitions 202, 300, 400, or 500 and more particularly by the disclosed Non-Shared Lower Energy Sub-partition 214 or digital baseband processing (e.g., 304, 402, or 502). In another aspect, means 702 may be implemented through hardware, software, firmware, or any combination thereof, such as through a combination of one or more elements 306, 318, 310, and 312 disclosed above.

Also illustrated in FIG. 7 is an alternative configuration where apparatus 700 may include a processor 708 and memory 710 for storing instructions executable by processor 708. The processor 708 may be configured to perform different functions to assist the various means in apparatus 700, such as sensing or determining wireless access technologies and causing a wakeup trigger to be sent to the primary transceiver. It is noted that apparatus 700 may be implemented as a first circuitry portion operable at a lower power than a second, active circuitry portion. Additionally, the various modules may be further operable to effect idle or sleep modes to save energy in the first circuitry portion.

Figure 8:
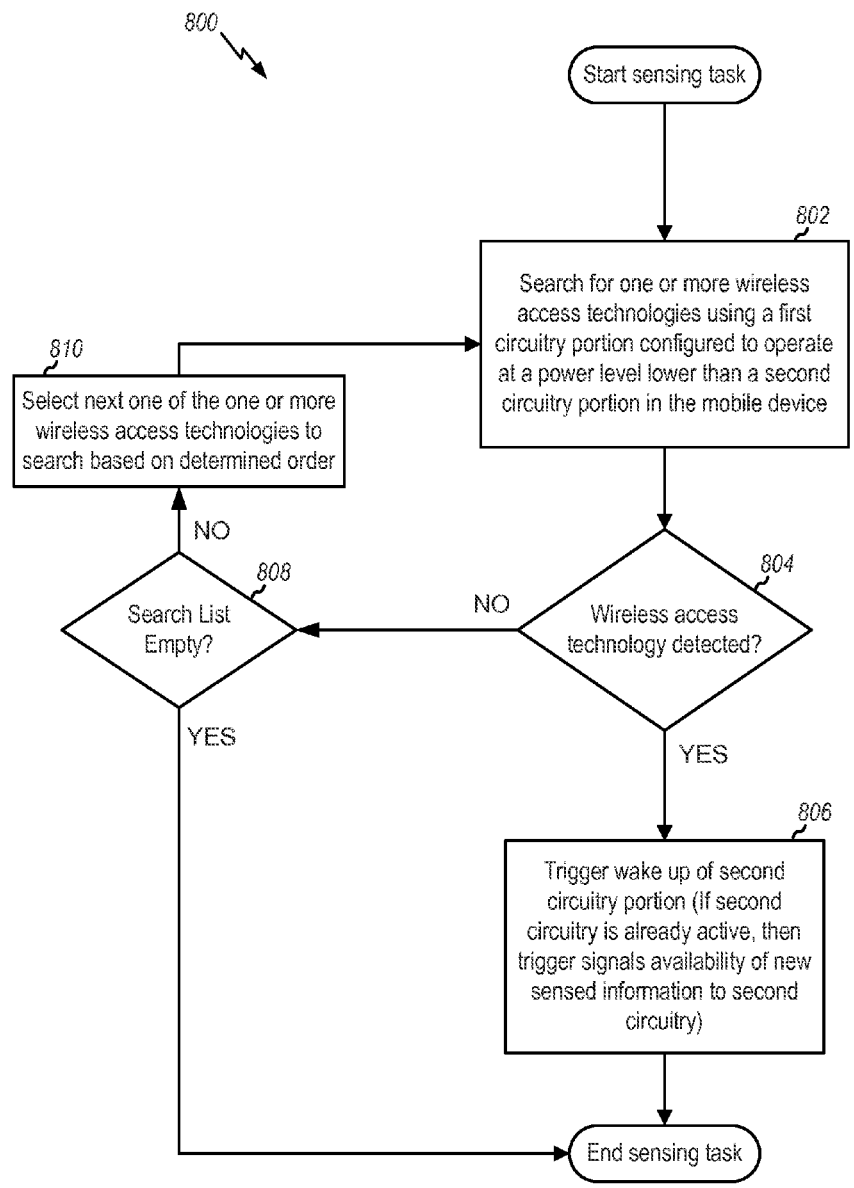
FIG. 8 is a flow diagram of a method for use in a mobile device for low power sensing of wireless technologies in a mobile device.

FIG. 8 flow diagram of another exemplary method 800 for use in a mobile device for low power sensing of wireless technologies in a mobile device. Upon initiating of a sensing task (i.e., a periodic initiation of searching for the one or more wireless access technologies), flow proceeds to block 802. At block 802 a search is performed for one or more wireless access technologies using a first circuitry portion configured to operate at a power level lower than a second circuitry portion in the mobile device. Flow then proceeds to decision block 804 to determine whether a wireless access technology has been detected. If a technology is detected, flow proceeds to block 806 where a triggering the wake up of second circuitry portion is initiated. It is noted that if the second circuitry is already active, then trigger may merely signal availability of new sensed information to second circuitry.

If, on the other hand, a technology is not detected in block 804, flow proceeds to another decision block 808 to determine if a search list is empty. The search list is a list of predetermined wireless access technologies that the wireless device has been configured to search. This list may be predetermined and in a predetermined order and stored in a memory, such as local memory 308, or may be adaptable, determinable, or variable as will be discussed later. If the list is empty as determined in block 808, this indicates that attempts have been made to sense each of the wireless access technologies in the list (thus exhaust of emptying of list), and the sensing task ends.

If, however, the list has not been exhausted as determined in block 808, flow proceeds to block 810. At block 810 a selection of a next one of the one or more wireless access technologies to search based on the predetermined order. Flow then proceeds to block 802 to search for the next selected wireless access technology and determination of whether the technology is present in block 804.

Figure 9:
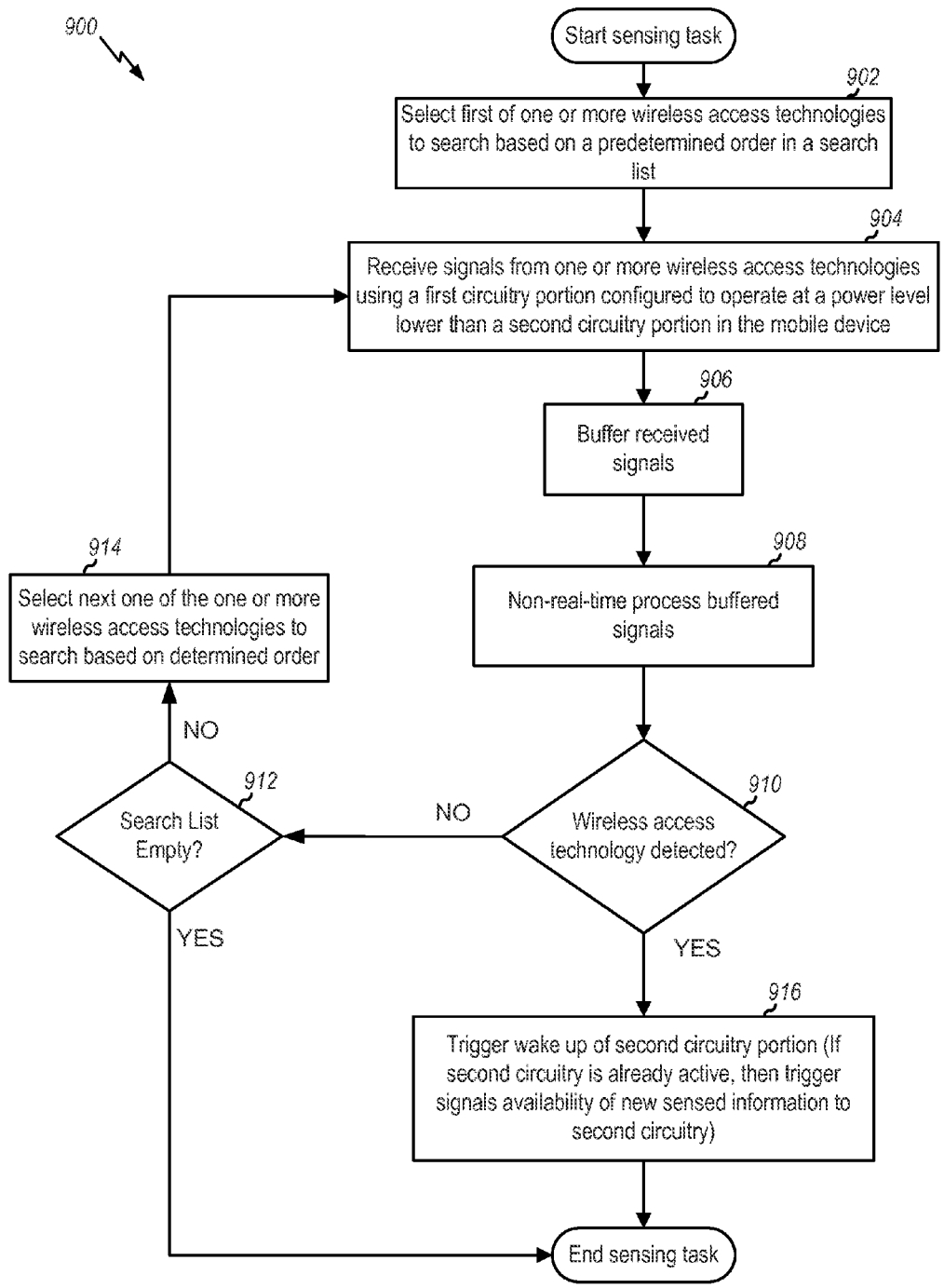
FIG. 9 is another flow diagram of a method for use in a mobile device for low power sensing of wireless technologies in a mobile device.

FIG. 9 another flow diagram of another method 900 for use in a mobile device for low power sensing of wireless technologies in a mobile device wherein signals may be buffered and processed in non-real time. After initialization of the sensing task flow proceeds to block 902 where a selection of a first one or more wireless access technologies to search based on a predetermined order in a search list of wireless access technologies. After selection in block 902, signals are received from one or more wireless access technologies using a first circuitry portion (e.g., 202 or 400) configured to operate at a power level lower than a second circuitry portion in the mobile device as illustrated in block 904). After the signals are received (or as they are being received in block 904), the signals are buffered as indicated by block 906.

Next, the buffered signals may then be non-real time processed to determine if the particular wireless access technology is present after non-real time processing as indicated in decision block 908. If the particular wireless access technology is not detected, flow proceeds to decision block 912 to determine if the search list is empty. If the list has not been exhausted, flow proceeds to block 914 to select the next one of the one or more wireless access technologies in the list, and return to block 904 for further reception of wireless signals. On the other hand, if the list has been exhausted the task terminates.

When a wireless access technology is detected as determined in block 910, flow then proceeds to block 916 where wake up of the second circuitry portion is initiated. If the second circuitry is already active, then trigger may merely signal availability of new sensed information to second circuitry.

Figure 10:
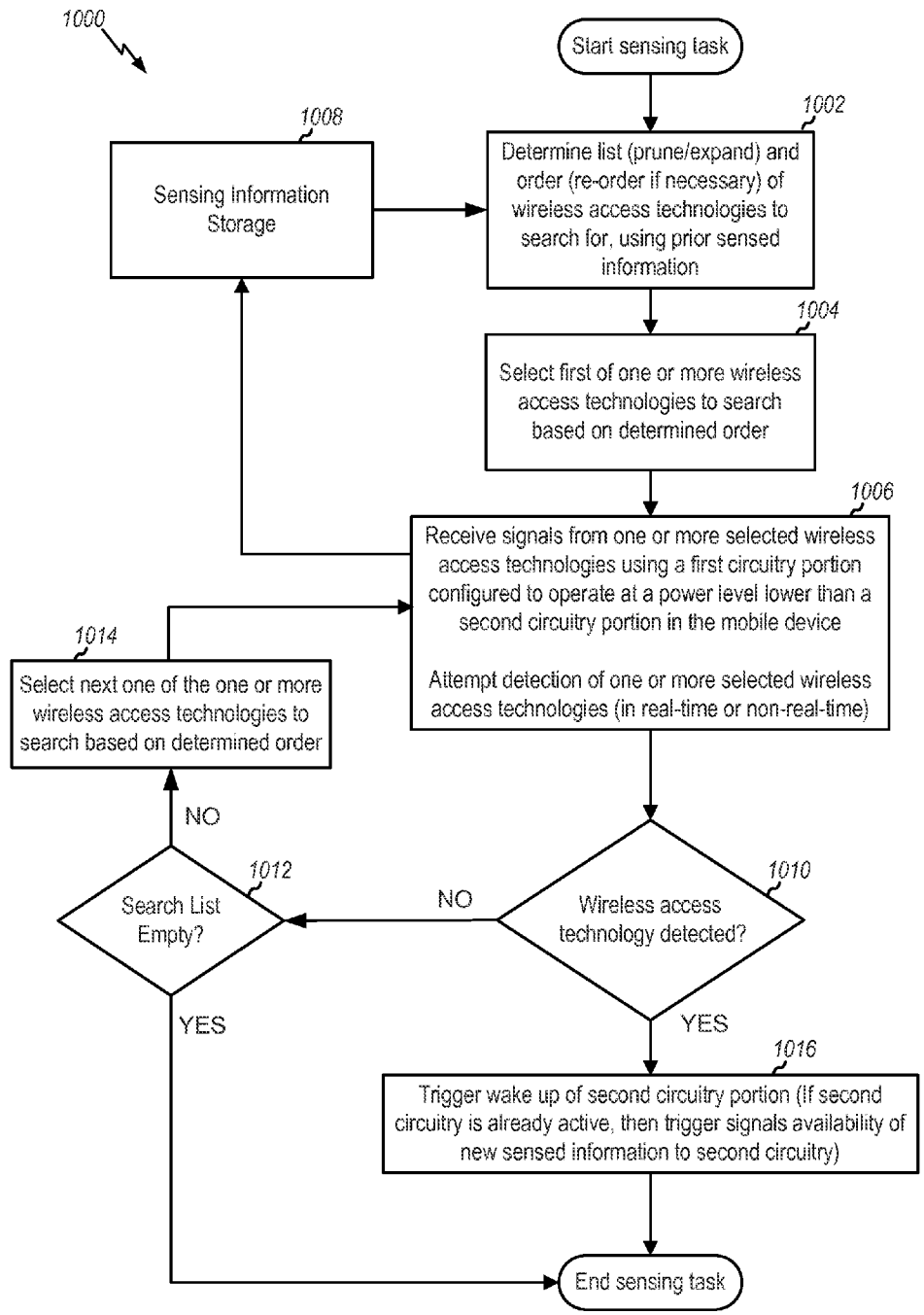
FIG. 10 is yet another flow diagram of a method for use in a mobile device for low power sensing of wireless technologies in a mobile device.

FIG. 10 yet another flow diagram of a method 1000 for use in a mobile device for low power sensing of wireless technologies in a mobile device through the use of adaptive sensing of wireless access technologies. After initialization, flow proceeds to block 1002 wherein a search list of wireless access technologies is determined and ordered based on prior sensed information (or first determined or ordered if no prior sensed information is available such as immediately after a device power up). Additionally, the process of block 1002 may include change the list to either expand or prune the list, and reorder the list if necessary using the prior sensed information After determination and/or ordering of the search list, flow proceeds to block 1004 where the first of one or more wireless access technologies is selected to be searched based on determined order from the process in block 1002. Flow then proceeds to block 1006 involving the process of receiving signals from one or more of the selected wireless access technologies using a first circuitry portion configured to operate at a power level lower than a second circuitry portion in the mobile device. It is noted that in an aspect detection of one or more selected wireless access technologies after reception may be performed either in real-time or non-real-time.

It is noted that the sensed information from the received signals may be fed back for storage as indicated by block 1008. This stored information may be used to enable adaptive sensing where the list determination of block 1002 is modified or changed in adaptation to the prior sensed information from storage performed in block 1008.

Additionally after the process of block 1006, flow proceeds to decision block 1010 to determine whether the particular wireless access technology has been sensed or detected. If not, flow proceeds to decision block 1012 to determine whether the search list is empty. If the search list is empty, indicating all wireless access technologies in the list have been attempted to be detected, the sensing task performed by method 1000 terminates. If the search list is not empty flow proceeds to block 1014 where a next one of the one or more wireless access technologies is selected based on the determined order (as determined previously in block 1002) and then return to block 1006 for a subsequent search for the selected wireless access technology.

If, at block 1010, a wireless access technology is detected, flow may then proceed to block 1016. At block 1016 issue of a trigger wakeup of the second circuitry portion (e.g., the primary transceiver) is performed. If the second circuitry is already active, then trigger may merely signal availability of new sensed information to second circuitry. After the trigger is issued in block 1016, the sensing task effected by method 100 terminates.

It is noted that although the methods illustrated in FIGS. 6 and 8-10 are shown as singular operation, it will be appreciated that the sensing task and attendant processes may be repeated periodically as predetermined to continue to sense wireless access technologies. Furthermore, after termination of the methods 600, 800, 900 or 1000, the first lower power circuitry portion may be put in a sleep or idle mode to conserve power and then awoken or made active at a fixed or variable periodicity to once again perform the sensing task(s).

In light of the foregoing description, it may be seen that the present disclosure provides methods and apparatus that afford lower power searching for or sensing of wireless signals for one or more wireless access technologies, including WAN and LAN technologies. Thus, lower energy portions of a platform may perform sensing at low power, while higher energy portion of the platform sleep, resulting in increased power savings. It is also contemplated that the lower power partition (e.g., 202) may include a demodulator and decoder to decipher or determine additional information regarding wireless technologies from the received signals. Furthermore, it is also contemplated that the presently disclosed apparatus and methods could be used to provide low energy paging support (an example of low energy paging being explained in the U.S. patent application Ser. No. 12/152,911 by Kohlmann et al., filed May 19, 2008 and incorporated herein by reference).

It can be appreciated from the above description that the disclosed methods and apparatus provide that when a particular system is in an out-of service mode, higher power radios such as the primary transceiver can be shut down in the power domains that they reside in, with only the lower power sensing circuitry remaining operational with its own sleep or idle mode. The period of wakeup for the sensing circuitry can be kept uniform or varied during the entire duration of operation of the device. Also, a period of wakeup can be changed if the device is shut down and the device restarted. All of the sensing circuitry or merely a portion of the sensing circuitry may be always active (such as the components comprising the timers (e.g., RTC timers) that wake up the sensing circuitry periodically. Accordingly, those skilled in the art will appreciate that the above described apparatus and methods by using lower power sensing circuitry to sense the presence of wireless access technologies, rather than using an awoken primary transceiver to sense those technologies, affords an increased power savings over known methodologies. The added ability of the lower power circuitry to be put into sleep or idles modes and periodically awoken to perform sensing tasks achieves an even greater power savings.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In alternatives, the storage medium may be integral to a processor. Also, the processor and the storage medium may reside in an ASIC and the ASIC may reside in a wireless device. In another alternative, the processor and the storage medium may reside as discrete components in a device.

The word "exemplary" is used herein to mean "serving as an example, instance, or illustration." Any example described herein as "exemplary" is not necessarily to be construed as preferred or advantageous over other examples.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A mobile device comprising:
a sensing circuitry portion configured to operate at a first power level wherein the sensing circuitry portion includes at least one configurable searcher that is operable to sense signals of one or more of a plurality of wireless access technologies supported by the mobile device, where the signals for each of the plurality of wireless access technologies are receivable via a respective wireless chain of a plurality of wireless chains and a baseband processor that are within the sensing circuitry portion and are operable at the first power level; and
a processing circuitry portion including a primary transceiver and configured to demodulate and decode at least one sensed signal of the one or more of the plurality of wireless access technologies, the processing circuitry portion including the primary transceiver operable at a second power level higher than the first power level of the sensing circuitry portion in the mobile device and the primary transceiver operable for demodulating and decoding the at least one sensed signal.

2. The mobile device as defined in claim 1, wherein the at least one configurable searcher produces a trigger signal when a signal of any of the one or more of the plurality of wireless access technologies is sensed, and wherein the trigger signal transitions the processing circuitry portion from a power-saving state to the second power level to demodulate and decode the at least one sensed signal.

3. The mobile device as defined in claim 1, wherein the sensing circuitry portion is further configured to periodically wake up from one of an idle or sleep state and sense the one or more of the plurality of wireless access technologies at a predetermined periodicity wherein the periodicity is either fixed or variable.

4. The mobile device as defined in claim 1, wherein the sensing circuitry portion further comprises:
   a buffer configured to store received signals of the one or more of the plurality of wireless access technologies; and
   a non-real time processor configured to process the received signals stored in the buffer in a time domain independent from a time domain of at least one of the other circuitry in the sensing circuitry portion and the processing circuitry portion.

5. The mobile device as defined in claim 1, wherein the sensing circuitry portion further comprises:
   an adaptive engine configured to adaptively process the signals of the one or more of the plurality of wireless access technologies to at least one of reorder and prioritize a search list of the one or more of the plurality of wireless access technologies based on prior sensed information.

6. The mobile device as defined in claim 5, wherein the prior sensed information includes at least one of signal strength and signal correlation.

7. The mobile device as defined in claim 1, wherein sensing signals of the one or more of the plurality of wireless access technologies includes correlating received signals with at least one scrambling code.

8. The mobile device as defined in claim 1, wherein at least a portion of the sensing circuitry portion is configured with a lower leakage library of design components compared to components in the processing circuitry portion.

9. A method for operating a mobile device that supports multiple wireless access technologies comprising:
   searching for one or more of a plurality of wireless access technologies supported by the mobile device using a sensing circuitry portion configured to operate at a power level lower than a higher power level at which a processing circuitry portion including a primary transceiver in the mobile device operates, wherein the processing circuitry portion is configured to demodulate and decode signals of the one or more of the plurality of wireless access technologies supported by the mobile device and signals for each of the plurality of wireless access technologies are receivable via a respective wireless chain of a plurality of wireless chains and a baseband processor that are within the sensing circuitry portion and are operable at the power level lower than the higher power level at which the processing circuitry portion and the primary transceiver operate; and
   sending a wakeup trigger from the sensing circuitry portion to the processing circuitry portion when a signal of any of the one or more of the plurality of wireless access technologies is sensed during searching, wherein the wakeup trigger initiates a transition of the processing circuitry portion from a power-saving state to the higher power level.

10. The method as defined in claim 9, wherein the sensing circuitry portion is further configured to periodically wake up from one of an idle or sleep state and sense the one or more of the plurality of wireless access technologies at a predetermined periodicity wherein the periodicity is one of fixed or variable.

11. The method as defined in claim 9, further comprising:
   buffering received signals of the one or more of the plurality of wireless access technologies; and
   processing the received signals stored in a buffer in a time domain independent from a time domain of at least one of the other circuitry in the sensing circuitry portion and the processing circuitry portion.

12. The method as defined in claim 9, further comprising:
   adaptively processing the signals of the one or more of the plurality of wireless access technologies to at least one of reorder and prioritize a search list of the one or more of the plurality of wireless access technologies based on prior sensed information.

13. The method as defined in claim 12, wherein the prior sensed information includes at least one of signal strength and signal correlation.

14. The method as defined in claim 9, wherein sensing signals of the one or more of the plurality of wireless access technologies includes correlating received signals with at least one scrambling code.

15. The method as defined in claim 9, wherein at least a portion of the sensing circuitry portion is configured with a lower leakage library of design components compared to components in the processing circuitry portion.

16. A mobile device that supports multiple wireless access technologies comprising:
   means for sensing signals of one or more of a plurality of wireless access technologies supported by the mobile device and operable at a first power level, where the signals for each of the plurality of wireless access technologies are receivable via a respective wireless chain of a plurality of wireless chains and a baseband processor that are within the means for sensing signals and are operable at the first power level; and
   means for demodulating and decoding at least one sensed signal of the one or more of the plurality of wireless access technologies, and operable at a second power level higher than the first power level of the means for sensing signals, and the means for demodulating and decoding including a primary transceiver for demodulating and decoding the at least one sensed signal and operable at the second power level higher than the first power level.

17. The mobile device as defined in claim 16, wherein the means for sensing signals is configured to produce a trigger signal when a signal of any of the one or more of the plurality of wireless access technologies is sensed, and wherein the trigger signal transitions the means for demodulating and decoding from a power-saving state to the second power level to demodulate and decode the at least one sensed signal.

18. The mobile device as defined in claim 16, wherein the means for sensing signals is configured to periodically wake up from one of an idle or sleep state and sense the one or more of the plurality of wireless access technologies at a predetermined periodicity wherein the periodicity is either fixed or variable.

19. The mobile device as defined in claim 16, wherein the means for sensing signals further comprises:
   means for buffering received signals of the one or more of the plurality of wireless access technologies; and
   means for processing the received signals stored in the means for buffering in a time domain independent from a time domain of at least a portion of circuitry in the means for sensing signals and a portion of circuitry in the means for demodulating and decoding.

20. The mobile device as defined in claim 16, wherein the means for sensing further comprises:
   means for adaptively processing the signals of the one or more of the plurality of wireless access technologies to at least one of reorder and prioritize a search list of the one or more of the plurality of wireless access technologies based on prior sensed information.

21. The mobile device as defined in claim 20, wherein the prior sensed information includes at least one of signal strength and signal correlation.

22. The mobile device as defined in claim 16, wherein the means for sensing includes means for correlating received signals with at least one scrambling code.

23. The mobile device as defined in claim 16, wherein the means for sensing includes a circuitry portion configured with a lower leakage library of design components compared to components in the means for demodulating and decoding.

24. A computer program product for use within a mobile device that supports multiple wireless access technologies, the computer program product comprising a non-transitory computer readable medium having stored thereon:
   code for causing a computer to search for one or more of a plurality of wireless access technologies supported by the mobile device using a sensing circuitry portion configured to operate at a power level lower than a higher power level at which a processing circuitry portion including a primary transceiver in the mobile device operates, wherein the processing circuitry portion is configured to demodulate and decode signals of the one or more of the plurality of wireless access technologies supported by the mobile device and signals for each of the plurality of wireless access technologies are receivable via a respective wireless chain of a plurality of wireless chains and a baseband processor that are within the sensing circuitry portion and are operable at the power level lower than the higher power level at which the processing circuitry portion and the primary transceiver operate; and
   code for causing a computer to send a wakeup trigger from the sensing circuitry portion to the processing circuitry portion when a signal of any of the one or more of the plurality of wireless access technologies is sensed during searching, wherein the wakeup trigger initiates a transition of the processing circuitry portion from a power-saving state to the higher power level.

25. The computer program product as defined in claim 24, wherein the sensing circuitry portion is further configured to periodically wake up from one of an idle or sleep state and sense the one or more of the plurality of wireless access technologies at a predetermined periodicity wherein the periodicity is one of fixed or variable.

26. The computer program product as defined in claim 24, the non-transitory computer readable medium further comprising:
   code for buffering received signals of the one or more of the plurality of wireless access technologies; and
   code for causing a computer to process the received signals stored in a buffer in a time domain independent from a time domain of at least one of the other circuitry in the sensing circuitry portion and the processing circuitry portion.

27. The computer program product as defined in claim 24, the non-transitory computer readable medium further comprising:
   code for causing a computer to adaptively process the signals of the one or more of the plurality of wireless access technologies to at least one of reorder and prioritize a search list of the one or more of the plurality of wireless access technologies based on at least one of signal strength and signal correlation.

28. The computer program product as defined in claim 24, wherein sensing signals of the one or more of the plurality of wireless access technologies includes correlating received signals with at least one scrambling code.

29. The computer program product as defined in claim 24, wherein at least a portion of the sensing circuitry portion is configured with a lower leakage library of design components compared to components in the processing circuitry portion.

* * * * *